Sept. 8, 1964  J. S. ELBOGEN ETAL  3,147,771
BALANCED SUPPLY-EXHAUST VALVE
Filed Oct. 11, 1961  2 Sheets-Sheet 1
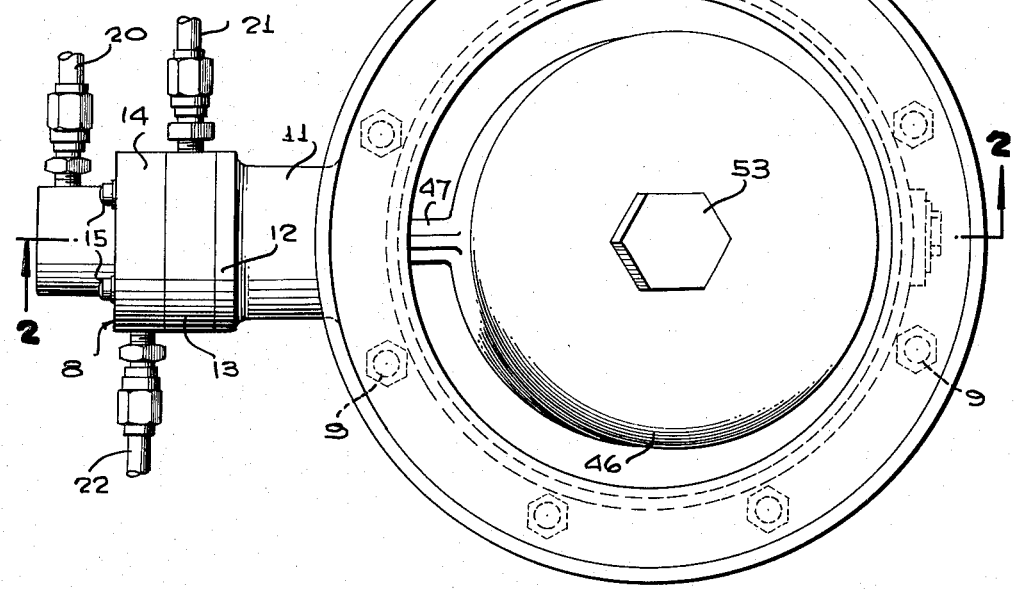
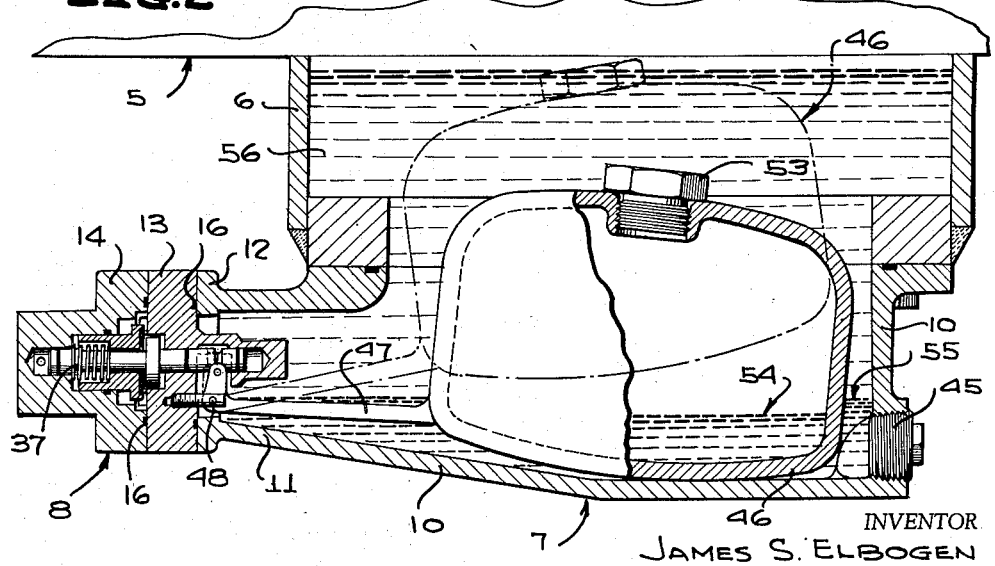
INVENTOR
JAMES S. ELBOGEN
& JAMES S. MILLAR
BY Mason, Porter, Diller & Stewart
ATTORNEYS Sept. 8, 1964   J. S. ELBOGEN ETAL   3,147,771
BALANCED SUPPLY-EXHAUST VALVE
Filed Oct. 11, 1961   2 Sheets-Sheet 2
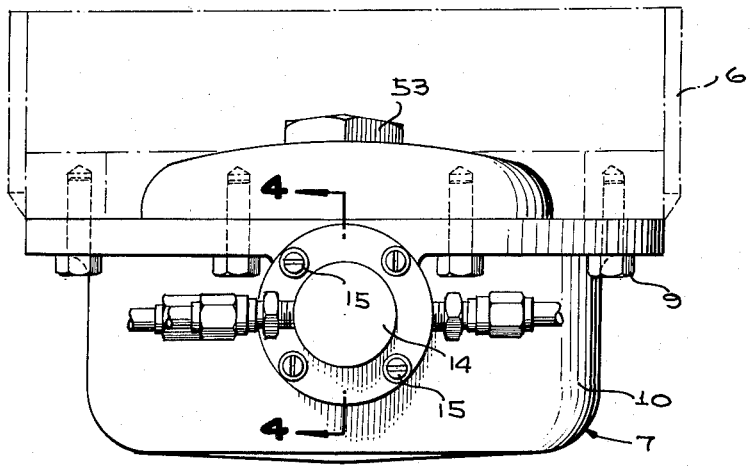
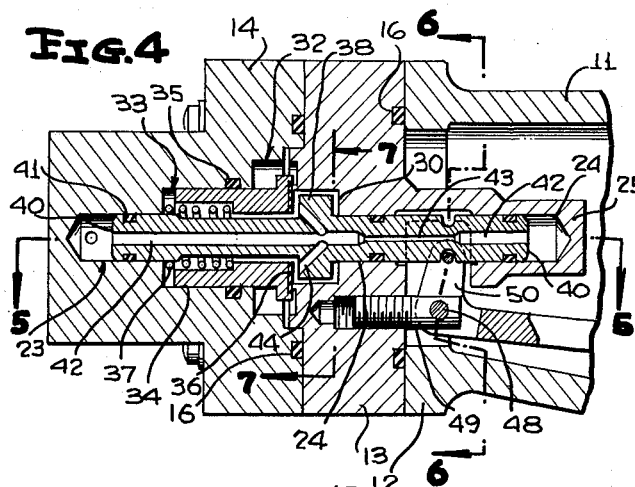
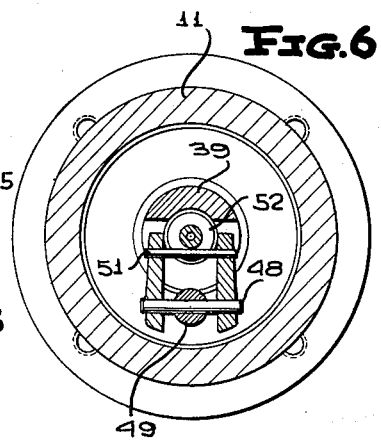
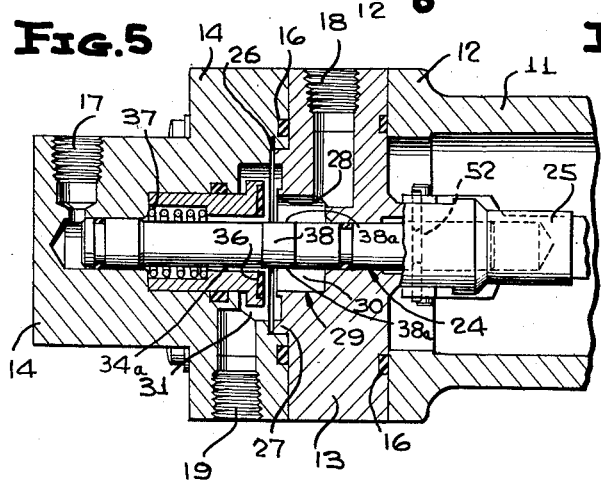
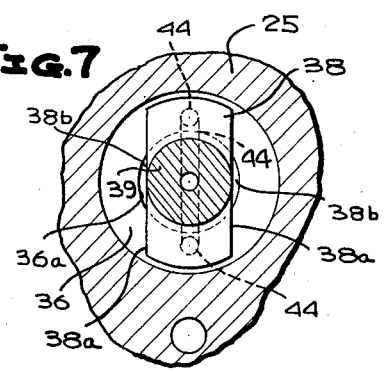
INVENTORS
JAMES S. ELBOGEN
& JAMES S. MILLAR
BY Mason, Porter, Diller & Stewart
ATTORNEYS United States Patent Office 3,147,771
Patented Sept. 8, 1964

3,147,771
BALANCED SUPPLY-EXHAUST VALVE
James S. Elbogen, Encino, and James S. Millar, Los Angeles, Calif., assignors to Parker-Hannifin Corporation, Cleveland, Ohio, a corporation of Ohio
Filed Oct. 11, 1961, Ser. No. 144,338
4 Claims. (Cl. 137—627.5)

The invention relates generally to float valves and primarily seeks to provide a novel form of such valve structure which, while adaptable to other uses, is particularly effective in airplane fueling systems wherein the infeeding of the fuel is controlled by pressure regulator valve means including reference pressure actuated servo means and there are included means for filter-separating water from the fuel, said novel valve structure serving normally to permit reference pressure infeeding and flow for fuel feed controlling purposes, and being effective upon accumulation of a predetermined amount of water to bring about a discontinuance of the infeeding of reference pressure and a venting of reference pressure, thereby to stop the feeding of fuel until the objectionable water accumulation has been eliminated.

An object of the invention is to provide an improved float operated valve of the character stated wherein there is included a flow controlling plunger which is longitudinally shiftable under float control, and which is pressure balanced for float action within the small difference in specific gravity between water and plane fuel, for example.

Another object of the invention is to provide a valve structure of the character stated wherein provision is made for introducing a greater or lesser amount of water ballast into the interior of the float, thereby to adjust to a nicety the buoyancy of the float so that it will be lifted by water accumulation, but not by fuel.

Another object of the invention is to provide a valve structure of the character stated wherein is included a fuel and water receiving sump in which the float is operable, means being provided for manually draining off an objectionable accumulation of water separated out of the fuel.

Another object of the invention is to provide a valve structure of the character stated wherein the flow controlling plunger has a bore therethrough and provision including the bore to balance pressures at opposite ends thereof, the float being pivotally supported and having a crank arm coupled with the plunger for imparting movement thereto as the float is caused to rise or fall.

A further object of the invention is to provide a valve structure of the character stated wherein the plunger carries a head or enlargement having outlet ports opening therethrough from the plunger bore and normally effective to deliver inlet pressure to the outlet, that is whenever the float is in a lowered position, means being provided and effective when the float is raised to close off the flow of pressure out of the plunger head ports and to the outlet.

A still further object of the invention is to provide a valve structure of the character stated wherein the means for closing off the flow of inlet pressure to the outlet comprises a spring pressed seat sleeve normally held against a seat to close off communication between the pressure outlet and a pressure vent whenever the float is in a lowered position, and engageable and displaceable from said seat by the plunger head whenever the float is lifted by an objectionable accumulation of water to permit venting of pressure, the ports in the plunger head being engageable with a sealing means on said head and sealed against inlet pressure egress by said sealing means during displacement of the seat sleeve by the head.

With the above and other objects in view that will hereinafter appear, the nature of the invention will be more clearly understood by reference to the following detailed description, the appended claims and the several views illustrated in the accompanying drawings.

In the drawings:

FIGURE 1 is a top plan view illustrating the improved float valve structure.

FIGURE 2 is a vertical longitudinal section taken on the line 2—2 on FIGURE 1.

FIGURE 3 is an end elevation.

FIGURE 4 is an enlarged fragmentary vertical longitudinal section taken on the line 4—4 on FIGURE 3, the valve seat being shown in the normal, float lowered, seated position.

FIGURE 5 is an enlarged fragmentary horizontal section taken on the line 5—5 on FIGURE 4, the valve seat sleeve being shown unseated, as by lifting of the float.

FIGURE 6 is a vertical cross section taken on the line 6—6 of FIGURE 4.

FIGURE 7 is a fragmentary vertical cross section taken on the line 7—7 on FIGURE 4.

In the practical development of the invention, as herein disclosed, the improved sump water collection operated float valve is of simple, balanced type, normally open to direct reference or control pressure to a control means such as a pressure regulator valve means, thereby to bring about the desired delivery of fuel to a tank or tanks of an airplane. In such plane fueling systems, there are included a filter-separator means generally designated 5 and including the depending portion 6 to which the water collecting sump portion 7 of the valve structure generally designated 8 is secured as indicated at 9 in FIGURE 2. In the embodiment herein described air is used to supply the control pressure but other fluids, including liquids, may also be used.

The sump portion is an open top hollow shell 10 having a hollow neck portion 11 which is flanged at 12 to oppose the intermediate body 13 which is in turn opposed to the end cap 14. The flanged neck portion 11, the intermediate body 13 and the end cap 14 are secured together by screw means 15 as shown in FIGURES 1 and 3, suitable seals 16 being interposed between the opposing faces of the parts 12, 13 and 14. The end cap 14 is equipped with an air inlet port 17, the intermediate body is provided with an air outlet port 18, and the cap also is equipped with a venting port 19, as best shown in FIGURES 1 and 5 of the drawings. The inlet port 17 is adapted for connection with an air inlet line 20, the outlet port 18 with an air outlet line 21, and the venting port 19 with a venting line 22.

The end cap 14 is equipped with a central bore 23 and the intermediate body 13 has an axially aligned bore 24 of like size extending therethrough and into an axial extension 25 provided on the intermediate body 13 and projected into the neck 11 as shown in FIGURES 4 and 5. A counterbore 26 is provided in the end cap 14, and a projection 27 formed on the intermediate body projects into said counterbore, the projection 27 having its endwise presented face angularly grooved to provide a valve seat 28.

The intermediate body 13 also is counterbored at 29 to provide a valve chamber 30 communicating with the outlet port 18 as shown in FIGURE 5, and with a chamber 31 formed by the counterbore 32 in the end cap 14. Said cap 14 is provided with another counterbore 33 which slidably receives the valve seat sleeve 34, a seal being provided about the sleeve as at 35. The sleeve 34 is equipped with a head enlargement which is presented in the chamber 31 and faced with a seal seat ring 36, and said sleeve is urged by a compression spring 37 to normally seat on and seal the previously mentioned seat 28 provided on the intermediate body 13. The sleeve 34 is sealed by packing 35 and by the seat 28 on substantially equal diameters whereby the sleeve 34 is substantially balanced against air pressures acting endwise thereon.

The seal seat ring 36 carried by the head enlargement on the valve seat sleeve 34 is engageable by an abutment head 38 provided on the valve plunger 39 which is generally cylindrical in form and has like sized end portions 40, one thereof being disposed in each of the bores 23 and 24. Sliding seals are provided about the plunger in said bores as indicated at 41. An axial bore 42 is provided through the valve plunger 39, a reduced diameter or choke portion 43 being provided intermediately of the open ends of said bore 42. Outlet ports 44 are provided and are angled outwardly from the valve plunger bore 42 toward the face of the abutment head 38 which opposes the seal seat ring 36 on the valve seat sleeve 34, as will be apparent by reference to FIGURES 4 and 7 of the drawings.

The abutment head 38 is flattened on two sides as at 38ª, the distance between the flats being less than the diameter of the bore 34ª, through the sleeve 34 and the diameter of the bore 36ª in the seal seat ring 36 so as to provide openings 38ᵇ whereby the leftward end of the sleeve 34 is vented to the chamber 30 when the head 38 is against the seal seat ring 36 to close off the outlet ports 44. See FIGURE 7.

Drain means by which the sump shell 10 may be manually drained of an objectionable collection of water separated out of the fuel is indicated at 45.

A float member 46, preferably formed of cast aluminum alloy, is disposed in the sump shell 10 in the manner clearly illustrated in FIGURES 1 and 2, and said float member has an arm extension 47 which is pivotally supported at 48 on a supporting screw 49 affixed to the intermediate body member 13, as clearly illustrated in FIGURES 2, 4 and 6 of the drawings. The float arm extension 47 is bifurcated at the location of its pivotal mounting, as illustrated in FIGURES 4 and 6, and includes a crank portion 50. The crank portion carries a cross pin actuator 51 at its free end, said cross pin being engaged in a cross groove 52 formed in the valve plunger 39. Thus when the float 46 is lowered to the position illustrated in full lines in FIGURE 2, the valve plunger will be shifted to the position illustrated in FIGURE 4, and when the float is lifted to the position illustrated in dot and dash lines in FIGURE 2, the valve plunger will be shifted to the position illustrated in FIGURE 5.

The float sinks in fuel and floats in water. Thus, as water is separated out of the fuel in the filter separator, it gravitates into the sump shell 10, and when there has been a material accumulation of water it lifts the float and causes a shutting off of the feeding of fuel to the airplane tank or tanks until the water collected in the sump shell has been manually drained off. This draining off of objectionable water accumulation is accomplished by removal of the drain plug means 45.

The float must operate upon the difference in specific gravity between water (1.0) and fuel (approximately 0.85 maximum). The disclosed structure has been found to be very practical in utilizing this extremely small difference in specific gravity, providing more than enough safely factor to guarantee operation under all service conditions. A removable fill plug 53 is provided in the float as shown in FIGURES 1 and 2 and through this means water ballast 54 can be introduced into the float in order accurately to determine the buoyancy of the float in the water-fuel collection and assure that the float will be lifted only by an objectionable accumulation of water, and not by fuel in the collecting sump. A water collection in the sump is indicated at 55 and fuel collection at 56.

In the operation of the float valve structure, the valve is normally in the float lowered, valve open position illustrated in FIGURES 1, 2 and 4 of the drawings. It will be apparent by reference to FIGURE 4 that in this open condition of the valve, air under a predetermined reference pressure enters through the port 17 and inlet line connection 20, passes through the valve plunger bore 42 to act on the like pressure areas at opposite ends of the plunger, and through the now opened angled ports 44 and out through the outlet 18 and its delivery line 21 into the fuel feeding control system. At this time, the valve seat sleeve 34 and its seal seat ring 36 are pressed against the seat 28 by the compression spring 37 and communication between the outlet 18, the chamber 30 and the venting port 19 is closed off.

Upon accumulation of an objectionable amount of water in the sump shell 10, the float 46 will be lifted from its full line position in FIGURE 2 to the dot and dash line position there shown, and the plunger valve will be shifted from the position illustrated in FIGURE 4 to the closed position illustrated in FIGURE 5. In this position, the abutment head 38 will have been moved against the seal seat ring 36, sealing off the angled outlet ports 44 from communication with the chamber 30 and the outlet port 18, and the valve seat 34 will have been shifted to the left against the action of the spring 37 to unseat the seal seat ring 36 from seat 28 and open communication between the delivery pressure line 21, port 18, chamber 30, chamber 31 and the venting port 19. This venting of the air pressure will serve to bring about a discontinuance of the infeeding of air under reference pressure and a resulting stopping of the feeding of fuel until the objectionable water accumulation in the sump shell 10 has been manually drained off at 45 and the float is permitted to gravitate to its full line position illustrated in FIGURE 2 and thereby restore the normal open condition of the valve illustrated in FIGURE 4.

The herein disclosed integral three-way valve is simple in construction and efficient in operation, a balanced pressure design being provided.

While a preferred structure and arrangement of parts embodying the invention are disclosed herein, it is to be understood that variations in structure and part arrangements may be made without departing from the scope of the invention as defined in the appended claims.

We claim:

1. A valve comprising a casing having pressure inlet means, pressure delivery outlet means and pressure venting means, valve means in said casing, said valve means including a reciprocal plunger having an axial pressure flow bore therethrough and like area end portions subjected to balance pressure endwise of said bore, said reciprocal plunger being operative in a first position to receive pressure through the inlet means and deliver it to the outlet means while closing off the venting means and being operative in a second position to close off pressure communication between the inlet means and the outlet means while opening communication between the outlet means and the venting means, said plunger having passageways for receiving pressure through the inlet means and deliver it to the outlet means in the first position of said plunger, seat means normally closing communication between the outlet means and the venting means in the first position of said plunger, means normally biasing said seat means to the normal position thereof, and means movable with the plunger to engage and displace the means normally biasing the seat means to open communication between the venting means and the outlet means and closing off communication through the plunger between said inlet and outlet means.

2. A valve comprising a casing having pressure inlet means, pressure delivery outlet means and pressure venting means, valve means in said casing, said valve means including a reciprocal plunger having an axial pressure flow bore therethrough and like area end portions subjected to balance pressure endwise of said bore, said reciprocal plunger being operative in a first position to receive pressure through the inlet means and deliver it to the outlet means while closing off the venting means and being operative in a second position to close off pressure communication between the inlet means and the outlet means while opening communication between the outlet means and the venting means, said plunger having passageways for receiving pressure through the inlet means and delivering it to the outlet means in the first position of said plunger, seat means normally closing communication between the outlet means and the venting means in the first position of said plunger, a spring pressed valve seat sleeve surrounding the plunger and having thereon a seal seat ring normally held against said seat means to close off communication between the outlet means and the venting means in the first position of said plunger, a head movable with the plunger and having the plunger passageways opening therethrough in position for closing the seal seat ring so that when said head engages the seal seat ring it will first seal off communication through the plunger between said inlet and outlet means and then open communication between said outlet and said venting means.

3. A valve comprising casing means having pressure inlet means, pressure outlet means, and venting means, valve means in said casing operable in a first position thereof to receive pressure through the inlet means and deliver it to the outlet means while closing off the venting means and operable in a second position to close off pressure communication between said outlet means and the inlet means, said valve means including a reciprocal cylindrical plunger presenting like pressure areas at its opposite ends, means for directing inlet pressure against said like area plunger ends, seat means through which communication between the outlet means and the venting means may be provided, means normally held against said seat means to close off communication between the outlet means and the venting means when the plunger is reciprocated to a first position thereof, and means movable with the plunger to a second position of the plunger to engage and displace the means normally held against the seat to open communication between said venting means and said outlet means and close off communication through the plunger between said inlet and outlet means.

4. A valve comprising casing means having pressure inlet means, pressure outlet means and venting means, valve means in said casing, said valve means being operative in a first position to receive pressure through the inlet means and deliver it through the outlet means while closing off the venting means and also being operative in a second position to close off pressure communication between said outlet means and the inlet means, the valve means including a reciprocal cylindrical plunger presenting light pressure areas at opposite ends thereof, means for directing inlet pressure against said light area plunger ends, there also being included seat means through which communication between the outlet means and the venting means may be provided, a spring pressed valve seat sleeve surrounding the plunger and having thereon a seal seat ring normally held against said seat means to close off communication between the outlet means and the venting means when the valve means is in the first position thereof, and a head movable with the plunger upon the movement thereof to a second position, and having the plunger passageways opening therethrough in position for opposing the seal seat ring so that when said head engages the seal seat ring it will first seal off communication through the plunger between said inlet and outlet means and then open communication between said outlet and said venting means.

References Cited in the file of this patent
UNITED STATES PATENTS

| | | |
|---|---|---|
| 1,319,006 | Kimball | Oct. 14, 1919 |
| 1,354,311 | Landrum | Sept. 28, 1920 |
| 2,752,947 | Hruska | July 3, 1956 |
| 2,877,798 | Hansen | Mar. 17, 1959 |
| 2,897,836 | Peters | Aug. 4, 1959 |
| 3,073,337 | May | Jan. 15, 1963 |

FOREIGN PATENTS

| | | |
|---|---|---|
| 517,634 | Great Britain | Feb. 5, 1940 |